W. C. BAXTER.
LEVELING MACHINE.
APPLICATION FILED FEB. 24, 1913.

1,208,895.

Patented Dec. 19, 1916.
6 SHEETS—SHEET 4.

Witnesses
Wm. M. Rheem.
M. A. Hurley.

Inventor
William C. Baxter
by his Attorneys
Phillips, Van Everen & Fish

W. C. BAXTER.
LEVELING MACHINE.
APPLICATION FILED FEB. 24, 1913.

1,208,895.

Patented Dec. 19, 1916.
6 SHEETS—SHEET 5.

Witnesses
Wm. M. Rheem.
M. A. Hurley.

Inventor
William C. Baxter
by his attorneys
Phillips, Van Everen & Fish

UNITED STATES PATENT OFFICE.

WILLIAM C. BAXTER, OF BEVERLY, MASSACHUSETTS, ASSIGNOR TO UNITED SHOE MACHINERY COMPANY, OF PATERSON, NEW JERSEY, A CORPORATION OF NEW JERSEY.

LEVELING-MACHINE.

1,208,895.

Specification of Letters Patent.

Patented Dec. 19, 1916.

Application filed February 24, 1913. Serial No. 750,326.

*To all whom it may concern:*

Be it known that I, WILLIAM C. BAXTER, a citizen of the United States, residing at Beverly, in the county of Essex and State of Massachusetts, have invented certain new and useful Improvements in Leveling-Machines; and I do hereby declare the following to be a full, clear, and exact description of the invention, such as will enable others skilled in the art to which it appertains to make and use the same.

The present invention relates to leveling machines and more particularly to leveling machines which are provided with a leveling roll and a coöperating shoe supporting jack relatively movable to change the relative longitudinal position of the roll and jack.

The object of the present invention is to provide a machine of this type having a simplified and improved construction and which operates with a high degree of efficiency upon widely varying sizes and styles of shoe soles.

With this object in view, the several features of the invention consist in certain novel features of construction, combinations and arrangements of parts hereinafter described and claimed, the advantages of which will be obvious to those skilled in the art from the following description.

In the accompanying drawings.

The machine shown in the illustrated embodiment of the invention comprises two shoe supporting jacks, two vibrating sole leveling rolls coöperating respectively therewith, mechanism for actuating the jacks to change the relative longitudinal position of the jacks and rolls, means for connecting and disconnecting each jack and the jack actuating mechanism, and means for tipping the rolls to change the relative lateral inclination of each jack and its coöperating roll during the leveling operation. The jacks are indicated at 1 in the position which they assume when disconnected from the jack actuating mechanism and are journaled upon a rock shaft 2 supported in the front portion of the machine frame. An arm 5 is supported upon the rock shaft and is arranged to be connected with either of the jacks to oscillate the jack in a manner well known to those skilled in the art. The jack actuating mechanism consists generally of a cam 3 mounted upon the cam shaft 4, and operative connections between the cam and arm 5 to impart the proper movements to whichever jack is connected to the arm. The leveling rolls are indicated at 6 and are mounted to vibrate in roll carriers 7 secured to sleeves rotatably supported in roll carrying beds 8 which are pivotally mounted at 9 in the upper rear portion of the machine frame 10. The rolls are inclined laterally during the leveling operation by mechanism substantially the same as that disclosed in the patent to Winkley, No. 889,287, dated June 7, 1908. This mechanism, as shown clearly in the patent above referred to, consists of means for changing the relative lateral inclination of the roll and jack and means for independently adjusting the lateral inclination of the roll and jack for operation upon any one of a plurality of different portions of the shoe. The adjustment of the lateral inclination of the roll and jack for operation upon each portion of the shoe is made without affecting the lateral inclination of the roll and jack while a different portion of the shoe is being operated upon, and but a single adjustment is required to cause the roll to act in the desired manner on any portion of the shoe.

The jack actuating cam is so shaped that during the operation of the machine the jack is first moved inwardly to cause the leveling roll to traverse the forepart and shank of the shoe from the toe to the breast of the heel. The jack is then moved outwardly and inwardly to cause the leveling roll to traverse back and forth over the shank of the shoe from the breast of the heel to the junction of the shank and forepart and back again to the breast of the heel and is then moved outwardly to cause the leveling roll to again traverse the shank and forepart from the breast of the heel to the toe. During these movements of the jack the inclination of the leveling roll is changed to cause one side of both the forepart and shank to be properly leveled, after which the leveling roll is turned upon the toe of the shoe and the inward and outward movements of the jack above described are repeated while the inclination of the leveling roll is changed to properly level the opposite margin of the forepart and shank. The arm 5 has a depending arm 12 rigidly secured thereto and connected by a link 15 to an actuating lever 14 pivotally mounted upon the machine frame. In order to vary the extent of the oscillations imparted to the jack the link 15 is adjustably connected to the arm 12 through a block 16 slidingly supported in a curved slot formed in the arm and conveniently adjusted by the operator through suitable connections. When operating upon different styles of shoes it is necessary to vary the movements of the jack, causing the roll to traverse over the shank and forepart of the sole, and in order to accomplish this result without substituting a new actuating cam either in whole or in part, the lever 14 is connected to the cam 3 through a bell crank lever 20 carrying a cam roll 21. The angular position of the bell crank lever is automatically adjusted to vary the oscillatory movements imparted to the jack by mechanism fully disclosed in the patent to Winkley, No. 1,011,301, dated December 12, 1911 and forming no part of the present invention.

As the leveling roll is intended to turn permanently upon the toe of the shoe, the slotted arm 12 is arranged concentric with the pivotal connection of the link 15 when the jack is held with the toe of a shoe positioned beneath the leveling roll. With this construction and arrangement the adjustment of the jack actuating mechanism for operation upon varying sizes of shoes does not interfere in any manner with the turning of the roll at the toe. Under certain circumstances, however, particularly when changing the machine from adults' shoes to the smallest children's shoes or cacks, as they are known, the range of adjustment furnished by the slotted arm 12 is not sufficient, and accordingly two pivotal connections, indicated at 22 and 23 respectively, are provided for the link 15. The link is normally connected to the actuating lever at 22 and the slotted arm is arranged concentric with this pivotal connection, but when the pivotal connection 23 is used the arm is not concentric and if the slide block is adjusted in the arm the jack is displaced longitudinally in such a manner that the turning point of the roll does not take place at the toe of the shoe. In the present invention the roll is enabled to permanently turn at the toe irrespective of the size of the shoe operated upon by providing an adjustment for the slotted arm 12 relative to the arm 5 which enables the arm 12 to assume any one of a plurality of positions in which it is concentric with the pivotal connection of the link 15 when the shoe is positioned with its toe beneath the roll. In the illustrated embodiment of the invention the curved arm 12 is adjustably connected to the jack actuating arm 5 through bolt and slot connections indicated at 26, the slots being designed to allow a sufficient angular movement of the arm to position it concentric with either one of the pivotal connections which is employed.

Figure 7:
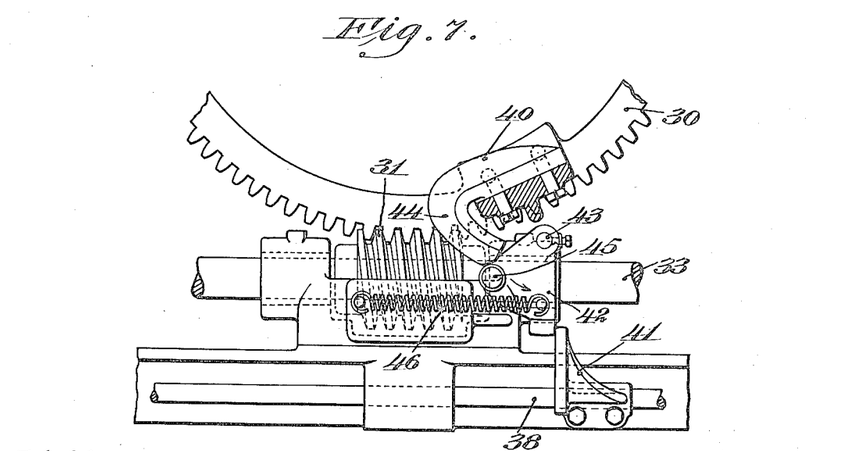
Fig. 7 is a detail illustrating the jack stopping mechanism.

It is often desirable to reverse the order of operations performed upon the sole by the leveling roll, and as the movement of the jack and its actuating mechanism is automatically stopped at the completion of the leveling operation it is desirable that the stopping mechanism shall be operative irrespective of the direction of movement of the jack and actuating mechanism. The cam shaft 4 is provided with a worm wheel 30 which is driven by a worm 31 secured to a countershaft 33. The countershaft 33 is operatively connected with a continuously rotated drive shaft 36 through a clutch 37, the operation of which is controlled by a shipper rod 38. The clutch is released to stop the operation of the jack actuating mechanism by a trip member 40 secured to the rim of the worm wheel and arranged to be operatively connected at each revolution of the worm wheel with an abutment 41 secured to the shipper rod 38. In order to cause the trip member 40 to always move the shipper rod in a direction to release the clutch irrespective of the direction of rotation of the worm wheel, a member 42 is pivotally supported at 43 and is interposed between the trip member 40 and the abutment 41. The trip member is provided with a depending curved end 44 which engages with a lateral stud 45 mounted upon the member 42 in such a manner that in whatever direction the worm wheel be rotating the member 42 will always be rocked to the right in the direction of the arrow to release the clutch. The member 42 is normally retained in an inoperative position by a tension spring 46 connecting the member with the machine frame.

The shoe supporting jack is provided with the usual toe post 50 and heel post 51 pivotally connected at 52 and moved toward and from one another to accommodate varying sizes of shoes by a threaded adjusting member 54. The heel of the last is supported upon a last block 55 which is inclined to clamp the shoe upon the jack by an actuating member 56 and suitable connections not shown. Each leveling roll is maintained in yielding engagement with the shoe sole by a separate spring which may be adjusted to vary the pressure of the roll on the sole. To this end a pressure lever 60 is pivotally supported at one end upon the machine frame and has its free end connected to the roll carrying bed through a link 61. The lever is pressed downwardly by a spring 62 supported in a casing 63 secured to the machine frame and interposed between an adjustable abutment 64 and the upper face of the lever 60. The force of the spring is conveniently varied by an adjusting member provided with an actuating handle 65 and operating in the usual manner to compress or relieve the spring. This construction provides a simple and compact means for independently pressing each roll into engagement with the shoe sole which takes up a minimum amount of space and which may be readily adjusted to vary the pressure.

In machines of this type it is customary to vibrate the leveling rolls continuously during the operation of the machine and this is conveniently accomplished by a countershaft 66 which is connected with the drive shaft 36 through pulleys 67 and 68 and a connecting belt 69. In existing constructions the vibration of the rolls is accomplished by connecting the rolls to the countershaft through adjustable eccentrics which impart a single vibration to the roll for each rotation of the shaft. This construction necessitates rotating the countershaft at a comparatively high rate of speed and if it is desired to vary the extent of the vibratory movement, the machine must be stopped and the eccentrics adjusted. In the present invention, a simple and compact mechanism is provided for vibrating the rolls at a higher rate of speed than the countershaft which may be conveniently adjusted during the operation of the machine to vary the extent of the vibratory movement imparted to the rolls. To this end the roll actuating mechanism comprises a driving disk, a controlling disk, a floating disk supported between the two first mentioned disks, mechanism for locking all of the disks against rotation relative to one another, having provision for a transverse movement of the floating disk relative to the others, and mechanism for adjusting one of the first mentioned disks transversely to the axis of rotation. In the illustrated embodiment of the invention two sets of disks are provided, and the floating disk in each case is connected directly to its respective roll to impart a vibratory movement to the roll.

Figures 8, 9:
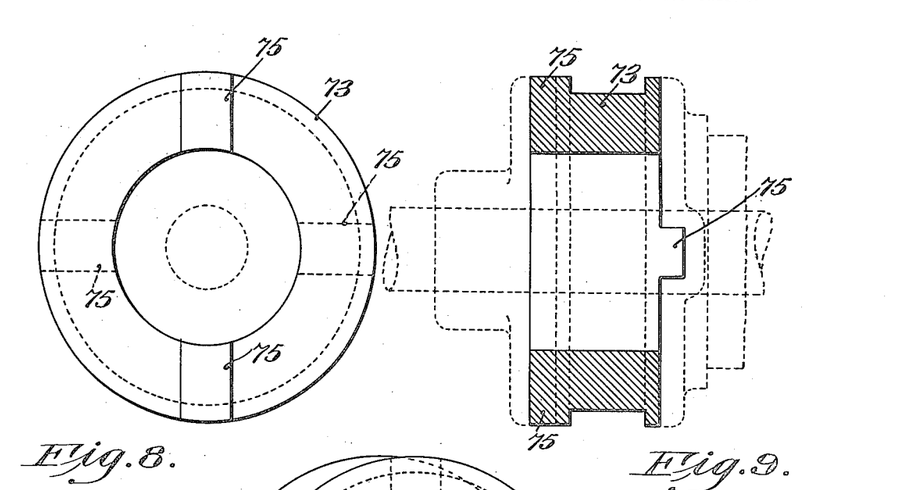
Fig. 8 is a detail showing the disk for vibrating the roll.
Fig. 9 illustrates a longitudinal section of the disk shown in Fig. 8.
Figure 10:
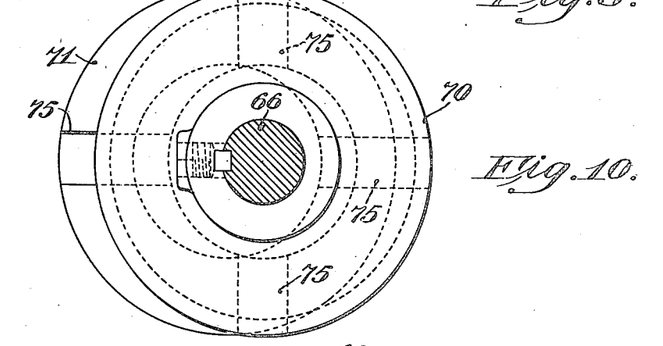
Fig. 10 is a detail illustrating an elevation of the several disks positioned eccentric to one another.

Each roll is vibrated by mechanism consisting of a driving disk 70 secured to the countershaft, a controlling disk 71 supported independently of the countershaft, and a floating disk 73 supported between the two first mentioned disks. The opposite faces of the disks 70 and 71 are provided with grooves extending substantially at right angles to one another and engaging with coöperating ribs 75 formed upon the floating disk 73, as shown clearly in Figs. 8 and 9. With this construction all of the disks are locked against rotation relative to one another, but movements of the floating disk in a plane normal to the axis of rotation are permitted. The disk 73 is provided with a strap 76 engaging an annular recess formed in the disk and connected to the roll in the usual manner through a slide 77, connecting rod 78, and yoke shaped head 79. In order to cause a rotation of the disks to impart a reciprocatory movement to the roll, the disk 71 is adjusted transversely to position it eccentric to the axis of rotation. When the controlling disk is held in an eccentric position a compound rotary and vibratory movement is imparted to the disk 73 upon rotating the driving disk, which action is illustrated clearly in Figs. 10 and 11. Each disk 71 is provided with an elongated hub 80 which is journaled in a head 81. In the preferred form of the invention illustrated, a single head 81 is provided in which both of the disks are journaled, and this head is adjusted transversely to locate both disks in the same relative position and impart vibratory movements of equal extent to both rolls.

Figure 1:
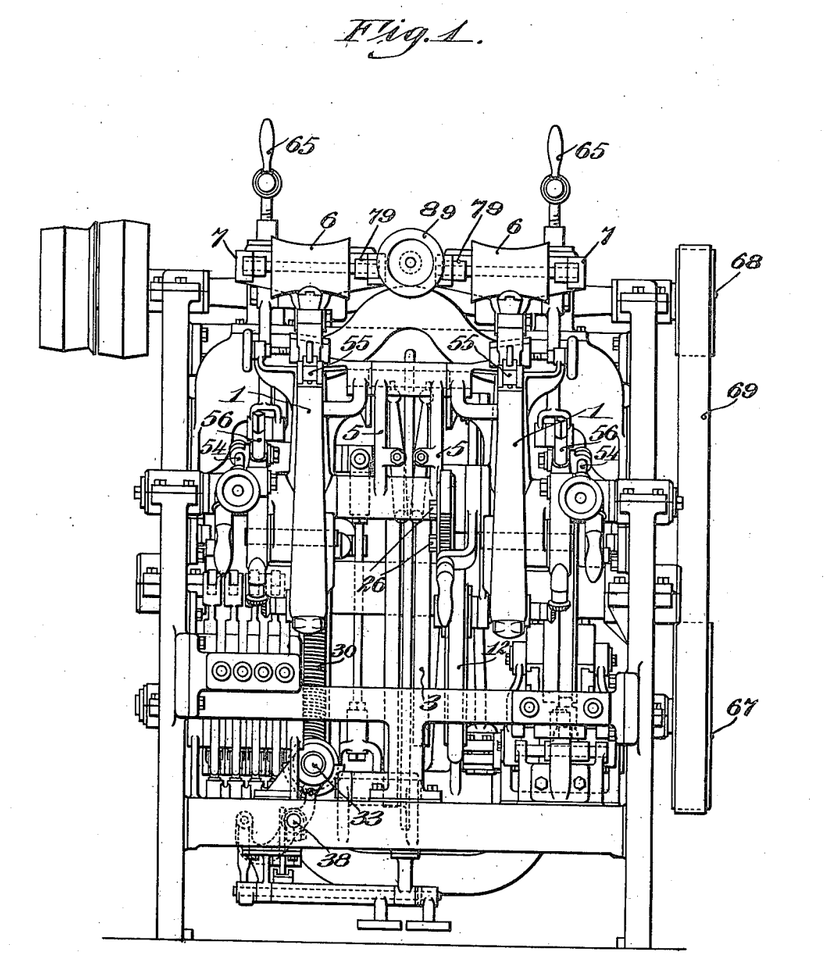
Figure 1 represents a front elevation of a machine embodying the several features of the invention in their preferred forms.
Figure 2:
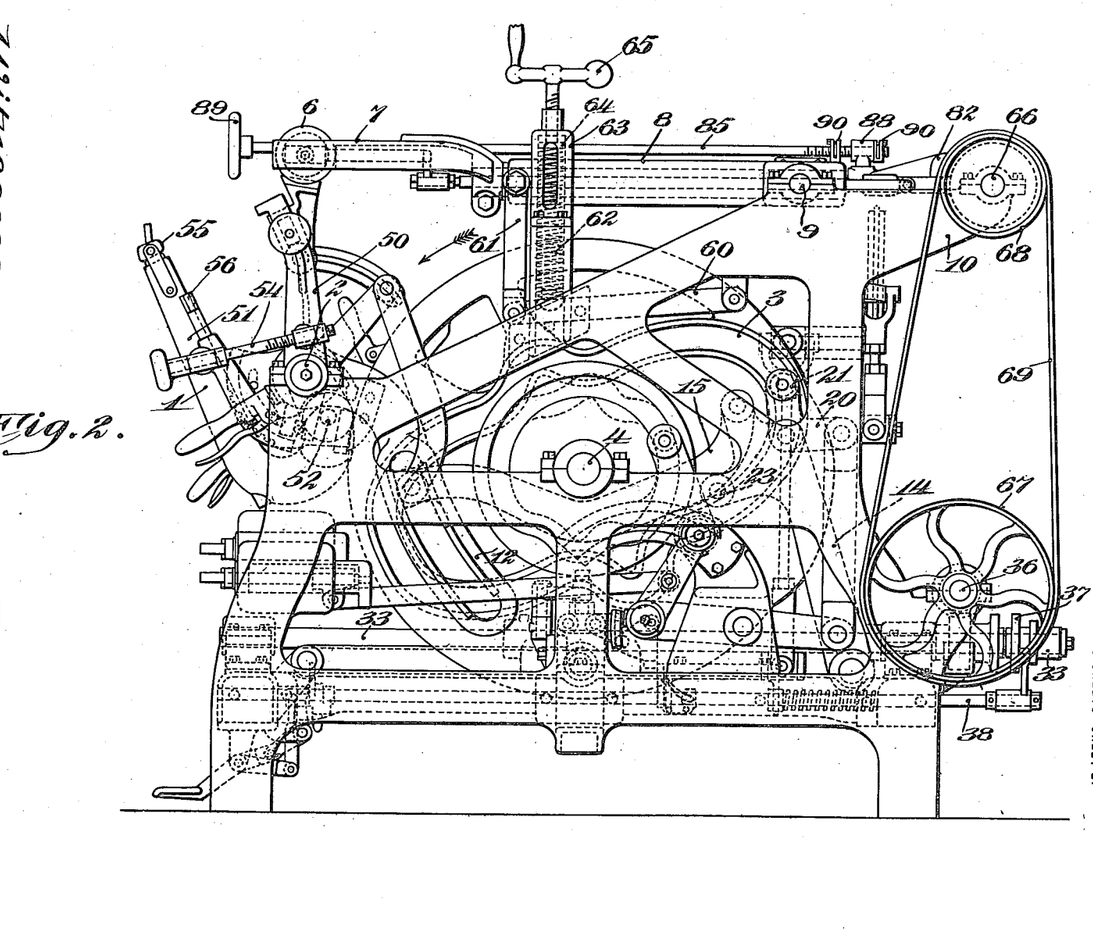
Fig. 2 is a right hand side elevation of the machine shown in Fig. 1.
Figure 3:
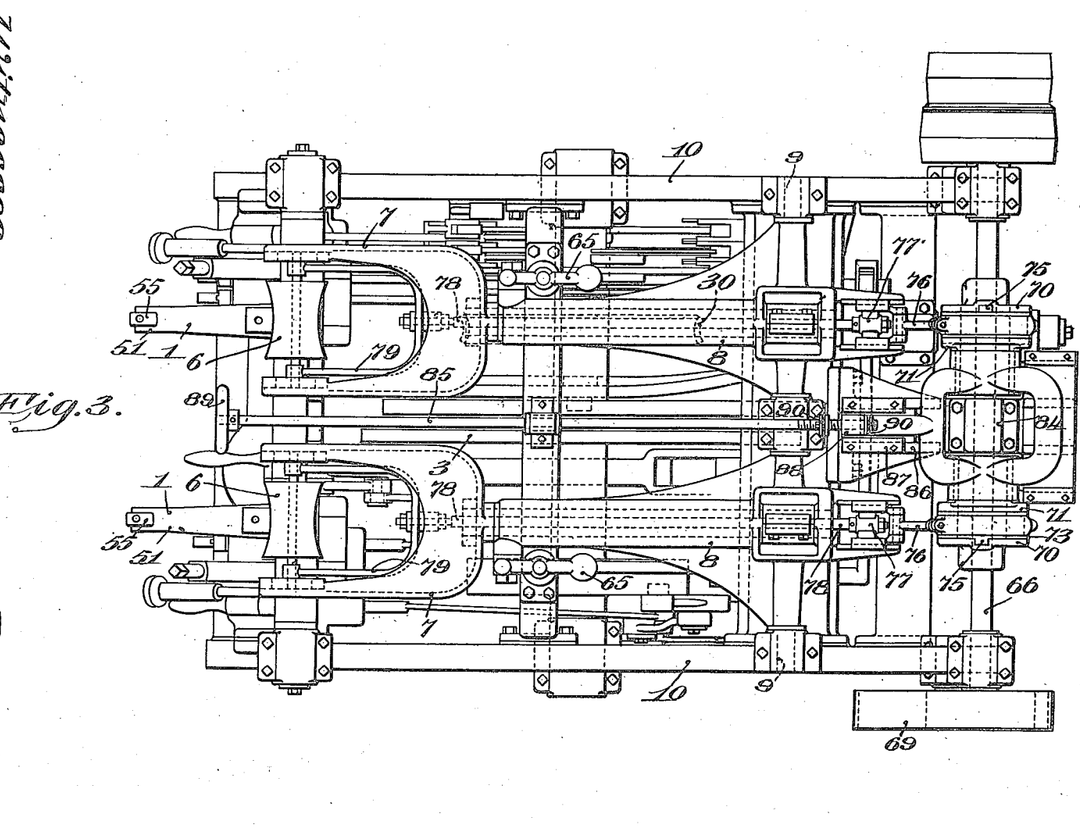
Fig. 3 is a top plan view of the machine shown in Fig. 1.
Figure 4:
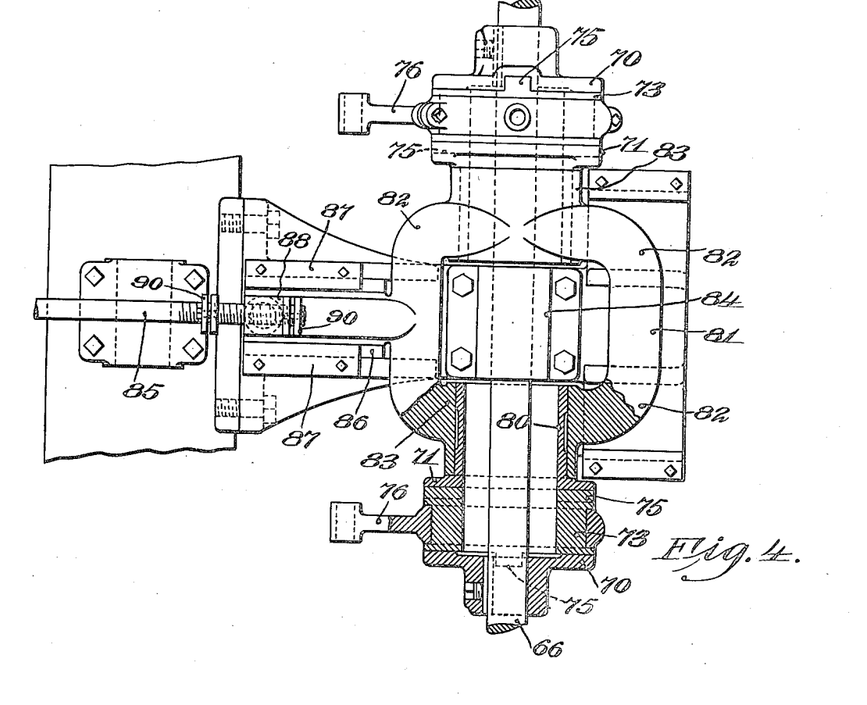
Fig. 4 is a detail illustrating a plan view partly in section of the mechanism for vibrating the leveling roll.
Figure 5:
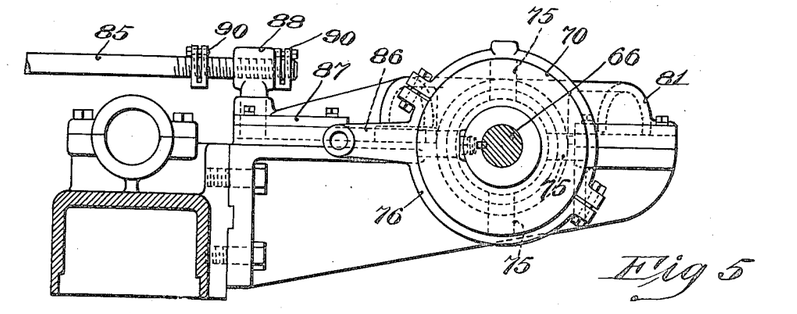
Fig. 5 is a detail illustrating a side elevation of the mechanism shown in Fig. 4.
Figure 6:
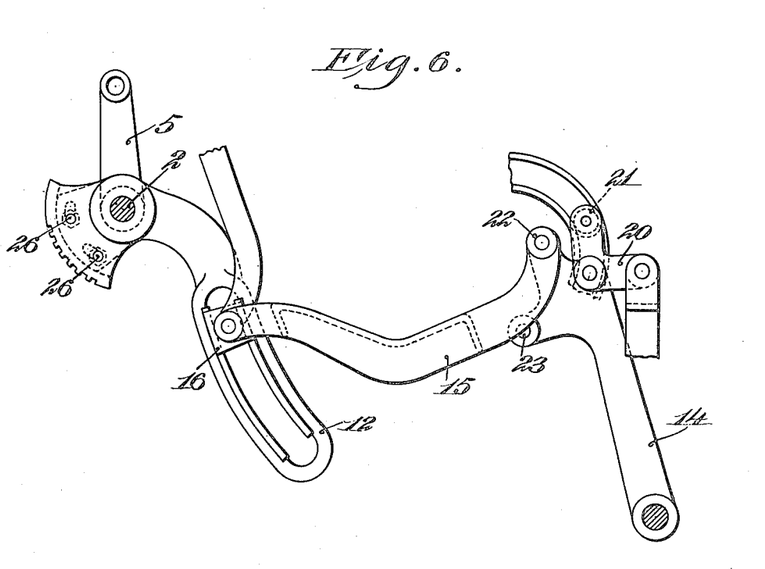
Fig. 6 is a detail illustrating a portion of the jack actuating mechanism.
Figure 11:
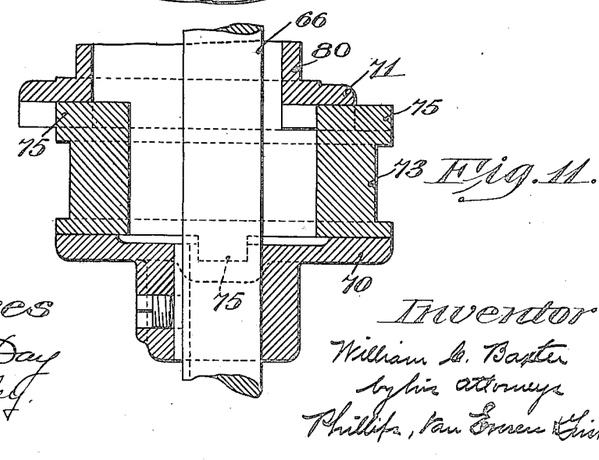
Fig. 11 is a detail showing a longitudinal section of the construction shown in Fig. 10.

In order to allow an eccentric movement of the disks relative to the countershaft both the disks 71 and 73, as shown clearly in Figs 4 and 11, are provided with axial bores of a diameter ample to accommodate all possible transverse movement of the disks. As shown clearly in Fig. 4, the head 81 consists of two U shaped arms 82 embracing between them spaced bearing members 83 in which the hubs 80 are journaled. The countershaft 66 is provided with a center bearing 84 secured to the machine frame between the bearing members 83, and supporting the shaft against the thrust of the roll vibrating mechanism. The head 81 is adjusted through an adjusting rod 85 extending forward into a position conveniently accessible to the operator and threadedly connected at its rear end with a slide 86 formed integral with one of the arms 82. The slide is supported in coöperating guideways 87 and is provided with an internally threaded head 88 through which the adjusting rod passes. The adjusting rod is provided at its front end with a hand wheel 89 and is retained against movement in the direction of its length so that upon a rotation of the rod the head 81 is adjusted transversely. The movement of the head 81 in opposite directions is conveniently limited by a pair of abutments 90 adjustably connected to the rod and arranged to engage with opposite sides of the head 88. With this construction a rapid vibration is imparted to the rolls by a comparatively slow rotation of the countershaft and the extent of this vibratory movement may be readily varied within desired limits without the necessity of either stopping or partially dismantling the machine.

While it is preferred to employ the specific construction and arrangement of parts shown and described, it will be understood that this construction and arrangement is not essential except so far as specified in the claims, and may be changed or modified without departing from the broader features of the invention.

The invention having been described, what is claimed is:—

1. A leveling machine, having, in combination, a leveling device, a shoe supporting jack, a continuously rotated drive shaft, a jack actuating shaft, a clutch intermediate the two shafts, a shipper rod controlling the operation of the clutch, an abutment secured to the shipper rod, a trip member supported by the jack actuating shaft, and an intermediate member interposed between the trip member and abutment and arranged to be engaged by the trip member to cause engagement of the intermediate member with the abutment to move the abutment in a direction to release the clutch independently of the direction of rotation of the jack actuating shaft.

2. A leveling machine, having in combination, a leveling device, a shoe supporting jack, a continuously rotated drive shaft, a jack actuating shaft, a clutch intermediate the two shafts, a shipper rod controlling the operation of the clutch, a trip member supported by the jack actuating shaft, and a connecting member interposed between the trip member and shipper rod and arranged to always move in one direction to release the clutch independently of the direction of rotation of the jack actuating shaft.

3. A leveling machine, having in combination, a leveling device, a shoe supporting jack, a continuously rotated drive shaft, a jack actuating shaft, a clutch intermediate the two shafts, a shipper rod controlling the operation of the clutch, a trip dog supported by the jack actuating shaft, and a pivotally mounted plate positioned in operative relation to the shipper rod and arranged to be engaged by the trip dog and always moved in the same direction independently of the direction of rotation of the jack actuating shaft.

4. A leveling machine comprising a continuously rotated drive shaft, a driven shaft, a clutch intermediate the two shafts, a trip dog supported by the driven shaft, a shipper rod controlling the operation of the clutch and having an abutment thereon, a plate pivoted upon the machine frame and normally disengaged from the abutment, and a stud mounted upon the plate and arranged to be engaged by the trip dog to always move the plate in a direction to release the clutch independently of the direction of rotation of the driven shaft.

5. A leveling machine, having in combination, a shoe supporting jack, a leveling roll, a roll supporting bed fulcrumed upon the machine frame, a pressure lever pivoted at one end, a link connecting the free end of the lever and the bed, and a spring bearing upon the lever between its ends and arranged to press the roll into engagement with the sole of a shoe supported upon the jack.

6. A leveling machine, having in combination, a shoe supporting jack, a leveling roll, a roll supporting bed fulcrumed upon the machine frame, a lever pivoted at one end, a link connecting the free end of the lever and the bed, a spring casing secured to the machine frame and having an adjustable abutment, and a spring interposed between the abutment and the lever and arranged to press the roll into engagement with the shoe sole.

7. A leveling machine having, in combination, a leveling device, a shoe supporting jack, a curved arm connected to the jack, an actuating lever, a link having one end pivotally connected to the lever at one of a plurality of points and its opposite end adjustably connected to the arm, and means permitting adjustment of the curved arm relative to the jack to position it concentric with the pivotal connection of the link.

8. A leveling machine, having, in combination, a leveling device, a shoe supporting jack, mechanism for oscillating the jack comprising an actuating lever, a curved arm connected with the jack and a link connected at its opposite ends to the lever and curved arm, and means permitting adjustment of the arm angularly with relation to the jack to position the arm concentric to the pivotal connection of the link without affecting the position of the jack relative to the leveling device.

9. A leveling machine having, in combination, a leveling device, a shoe supporting jack, an actuating lever, a link pivotally connected to the lever at one end, a curved arm adjustably connected to the opposite end of the link, and a jack actuating arm adjustably connected to the first mentioned arm allowing angular movement of the curved arm to position it concentric with the pivotal connection of the link without affecting the position of the actuating arm.

10. A leveling machine, comprising a leveling device, a head carrying the leveling device, a continuously rotated shaft, mechanism connected directly to the head and shaft for imparting a plurality of reciprocating movements to the leveling device for each rotation of the shaft, and means for adjusting the extent of the reciprocation imparted to the leveling device.

11. A leveling machine having, in combination, a shoe supporting jack, a leveling device, means for changing the relative longitudinal position of the leveling device and jack, mechanism for imparting a vibratory movement to the leveling device, and means for adjusting the extent of the vibratory movement during the operation of the machine.

12. A leveling machine comprising a pair of leveling rolls, mechanism for vibrating each roll comprising a driving disk, a controlling disk and a floating disk supported between the two first mentioned disks, a head supporting both of the controlling disks, and control means extending into a position conveniently accessible to the operator for adjusting the head transversely to vary the extent of the vibratory movement.

WILLIAM C. BAXTER.

Witnesses:
RUTH E. WARD,
CHESTER E. ROGERS.